United States Patent [19]

Aono

[11] 4,386,144
[45] May 31, 1983

[54] PROCESS FOR THE PRODUCTION OF MULTICOLOR OPTICAL FILTERS

[75] Inventor: Toshiaki Aono, Minami-ashigara, Japan

[73] Assignee: Fuji Photo Film Co., Ltd., Kanagawa, Japan

[21] Appl. No.: 295,285

[22] Filed: Aug. 24, 1981

[30] Foreign Application Priority Data

Aug. 23, 1980 [JP] Japan .................................. 55-116087

[51] Int. Cl.³ ................................................ G03C 7/16
[52] U.S. Cl. ........................................ 430/7; 430/383; 430/391; 430/505; 430/509
[58] Field of Search .................... 430/7, 383, 391, 505, 430/509

[56] References Cited

U.S. PATENT DOCUMENTS

| | | | |
|---|---|---|---|
| 2,321,195 | 6/1943 | Goldfinger | 430/505 |
| 2,391,198 | 12/1945 | Seymour | 430/503 |
| 3,650,739 | 3/1972 | Marthaler et al. | 430/509 |
| 4,170,479 | 10/1979 | Usami | 430/509 |
| 4,294,900 | 10/1981 | Aono | 430/509 |

Primary Examiner—J. Travis Brown
Attorney, Agent, or Firm—Sughrue, Mion, Zinn, Macpeak and Seas

[57] ABSTRACT

A process for producing a multicolor optical filter which comprises the steps of (1) exposing a light-sensitive material and (2) developing the exposed light-sensitive material, the process employing a specific light-sensitive material including a silver halide emulsion layer (L1) and a silver halide emulsion layer (L2), each layer containing therein a specific compound or dye. Such a multicolor optical filter is useful in color pick-up tubes and color solid state pick-up devices.

8 Claims, 15 Drawing Figures

FIG. 1
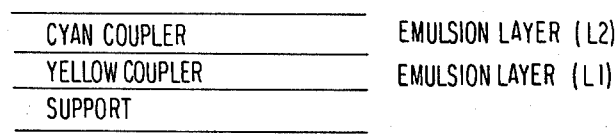
FIG. 2
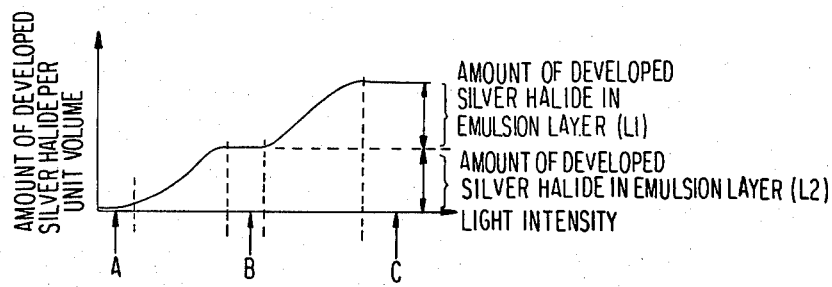
FIG. 3
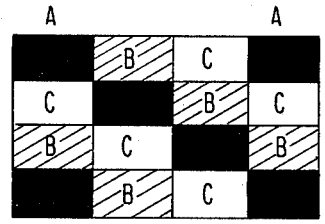
FIG. 4
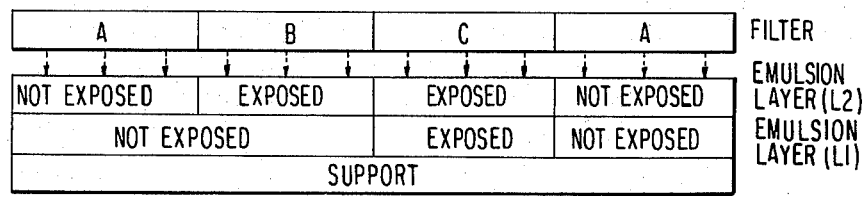
FIG. 5
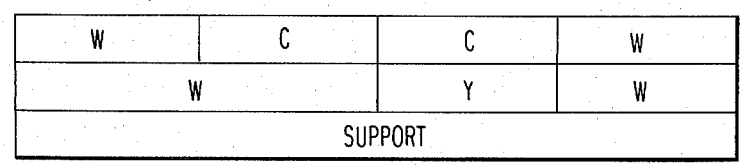
FIG. 6
| W | C | G | W |
|---|---|---|---|
| G | W | C | G |
| C | G | W | C |
| W | C | G | W |

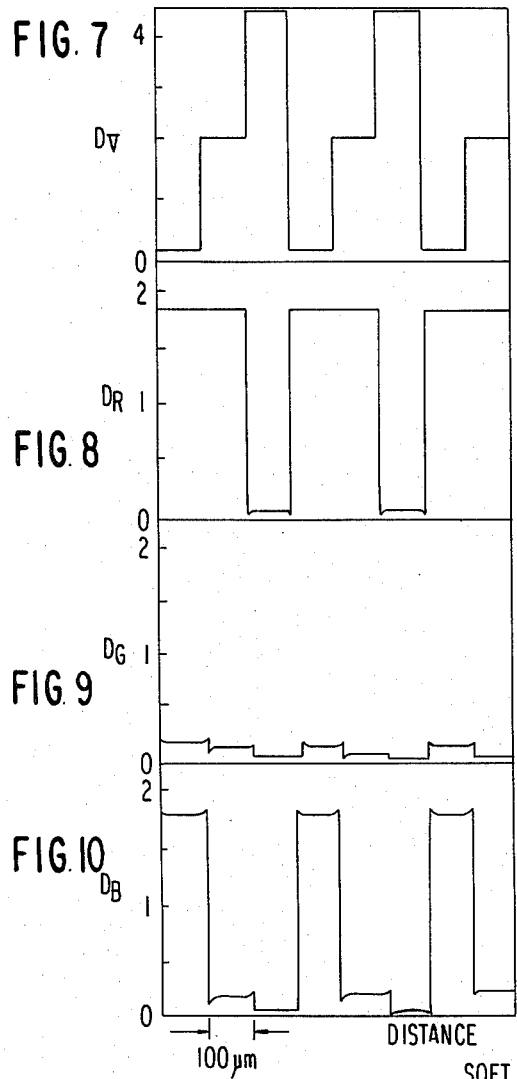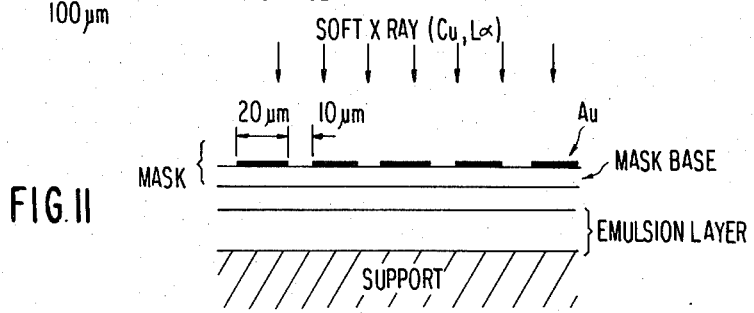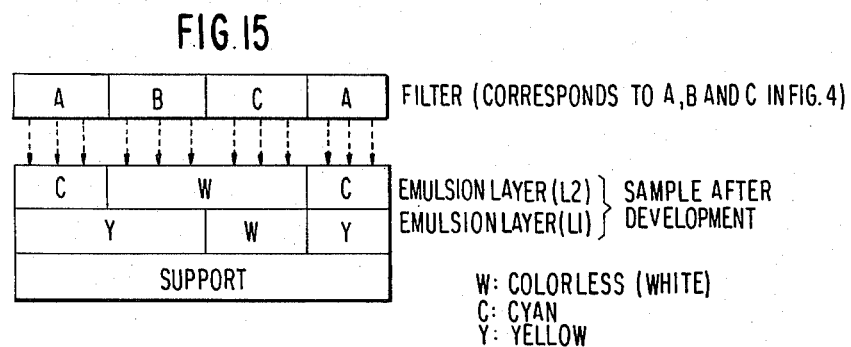

PROCESS FOR THE PRODUCTION OF MULTICOLOR OPTICAL FILTERS

FIELD OF THE INVENTION

The present invention relates to a process for the production of multicolor optical filters, and, more particularly, to a process for the production of multicolor optical filters for use in color image pick-up tubes, color solid state image pick-up devices, etc.

BACKGROUND OF THE INVENTION

Multicolor striped or mosaic form optical filters are used for color image pick-up tubes or color solid state image pick-up devices, such as color metal oxide semiconductor (MOS) devices, charged coupled devices (CCD), and charged injection devices (CID). A multicolor optical filter is usually composed of the three colors of red, green, and blue (additive process), or three colors of cyan, magenta, and yellow (subtractive process), regularly arranged in a stripe or mosaic form. Of course, the color composition of such multicolor optical filters is not necessarily limited to the three color systems. Provided that red, green, and blue output signals are finally obtained, the multicolor optical filter may be composed of two colors. For instance, it may be composed of white light and two colors of the foregoing additive or subtractive process three colors. As described hereinafter, these three signals can be easily converted into red, green, and blue output signals by an arithmetic circuit.

Conventional multicolor optical filters include a filter prepared using dichromic mirrors, as described, for example, in Japanese Patent Publication No. 8590/65 and Japanese Patent Application (OPI) No. 3440/77 (the term "OPI" as used herein refers to a "published unexamined Japanese patent application"), and a filter prepared by dyeing a polymeric material layer with dyes as described, for example, in Japanese Patent Application (OPI) Nos. 37237/72, 63739/73, and 66853/73, and Japanese Patent Publication No. 248/78.

Processes for the production of such conventional multicolor optical filters, however, are very complicated and troublesome, because a procedure comprising the steps of coating a photoresist, imagewise exposure of the photoresist (which in turn involves precise alignment of a mask on the photoresist layer), development of the exposed layer, coloring or decoloring, and removing the resist, is required for the formation of a pattern for each color in the system, and the procedure must be repeated several times (usually three or more times).

In practice, these processes require additional steps to obtain excellent multicolor optical filters. For example, in the case of producing multicolor optical filters by repeating several times the steps of coating a photoresist such as gelatin dichromate, imagewise exposure, formation of a relief pattern by development, and coloring, it is necessary to prevent a colored pattern formed in a previous coloring step from mixing with a different color in a subsequent color step. For this purpose, it is necessary to provide a protective layer, which will not be dyed, on the surface of a pattern-bearing layer in between the coloring steps, as described in Japanese Patent Application (OPI) No. 37237/72. This gives rise to the problems that the process becomes complicated and the multicolor optical filter obtained is very expensive.

In order to solve the foregoing problems, a process utilizing silver salt color photographic materials (hereinafter referred to as "color films") has been proposed. In accordance with the proposed process, a coupler-in-emulsion type or coupler-in-developer type color film is exposed to light through red, green, and blue master filters, or cyan, magenta, and yellow master filters, and is then subjected to ordinary color development to form a color filter composed of cyan, magenta, and yellow colors, or red, green, and blue colors, respectively, and the color film so formed is adhered to a glass disc such as a face plate of an image pick-up tube, and a thin glass plate is adhered to the color filter, to provide the desired multicolor optical filter.

In the color film used in the foregoing process, however, the size of silver halide grains in the emulsions is significantly large, and the emulsion layers are present in a multilayer structure wherein each emulsion layer has a sensitivity in its specific spectral wavelength region. Consequently, the scattering of light in the emulsion layers is severe, and therefore the resolving power of the color film is not so high.

U.S. Pat. No. 4,271,246 discloses a technique to obtain a very high resolving power by the use of a combination of a photographic light-sensitive material having known black-and-white fine grain silver halide emulsions and a coupler-in-developer type color development. This technique, however, requires at least three light-exposure and color development steps, and hence is very complicated.

Furthermore, in accordance with the conventional processes, it is necessary to use a specific mask in which red, green, and blue filters are arranged in a mosaic form for the light-exposure, and complicated steps are required to make the mask precise.

SUMMARY OF THE INVENTION

An object of the invention is to provide a process for producing multicolor optical filters suitable for use in color pick-up tubes, color solid state pick-up devices, and the like, inexpensively, by a procedure which is simplified to an extent almost equal to conventional photographic film processing.

Another object of the invention is to provide a process for producing multicolor optical filters in which the scattering of light in emulsion layers is reduced and which have high resolving power.

Still another object of the invention is to provide a process for producing multicolor optical filters which are free from the prior art defects as described above.

A further object of the invention is to provide a process for inexpensively producing multicolor optical filters using dyes which are stable against heat and light.

A still further object of the invention is to provide a process for inexpensively producing multicolor optical filters using dyes which have hue suitable for color pick-up tubes, solid state pick-up devices, and the like.

The present invention, therefore, relates to a process for producing a multicolor optical filter, comprising the steps of:
(1) exposing a light-sensitive material bearing:
   (M-a) a silver halide emulsion layer (L1) containing:
       a compound (1b) capable of forming a dye having any one of the subtractive process three principal colors in proportion to the amount of exposure by a development processing, or a dye (1c) having any one of the subtractive process three principal colors, and capable of losing the color in proportion to the amount of exposure by a development processing; and (M-b) an emulsion layer (L2) containing:
  a silver halide emulsion (2a) having a sensitivity sufficient to reach a state at which further development does not proceed when it is exposed to an amount of exposure at which no imagewise development occurs in the emulsion layer (L1); and, when compound (1b) is contained in layer (L1), a compound (2b) capable of forming a dye, which has a color of the subtractive process three principal colors other than the color of the dye resulting from the compound (1b) contained in emulsion layer (L1) by development processing; or, when compound (1c) is contained in layer (L1), a dye (2c) having a color of the subtractive process three principal colors other than that of the dye (1c) contained in the emulsion layer (L1), and capable of losing the color in proportion to the amount of exposure by development processing;

wherein said light-sensitive material has a surface divided into a number of areas, and said exposure is performed such that (a) some of the areas are unexposed, or are exposed only to an extent that no imagewise development occurs in the emulsion layer (L2), (b) some of the areas are exposed to the extent that further development does not proceed in the emulsion layer (L2), but no imagewise development occurs in the emulsion layer (L1), and (c) the remaining areas are exposed to the extent that further development does not proceed in the emulsion layer (L1); and (2) developing the exposed light-sensitive material.

BRIEF DESCRIPTION OF THE DRAWINGS

FIG. 1 is a cross-sectional view of a color light-sensitive material of the invention to illustrate the layer construction thereof;

FIG. 2 is a characteristic curve of the light-sensitive material shown in FIG. 1, as subjected to a black-and-white development;

FIG. 3 is an embodiment of a neutral filter used in the practice of the invention, wherein areas A, B, and C provide transmission densities shown at A, B, and C, respectively, in FIG. 2, for a specified amount of exposure;

FIG. 4 shows the states of reaction in the exposed light-sensitive material of FIG. 2;

FIG. 5 shows a color distribution pattern after the coupling reaction;

FIG. 6 shows a color distribution pattern of a multicolor filter obtained by this invention using the light-sensitive material shown in FIG. 1 and the filter shown in FIG. 3;

FIG. 7 is the density curve for the neutral filter used in Example 1;

FIG. 8 is the density curve for the red density of a multicolor optical filter obtained by the processing of Example 1;

FIG. 9 is the density curve for the green density of a multicolor optical filter obtained by the processing in Example 1;

FIG. 10 is the density curve for the blue density of a multicolor optical filter obtained by the processing in Example 1;

FIG. 11 is a schematic view showing the exposure method used in Example 2, wherein after shifting the mask by 10 microns, the photographic material is reexposed;

FIG. 12 is the density curve for the red density of a multicolor optical filter obtained by the processing of Example 3;

FIG. 13 is the density curve for the green density of a multicolor optical filter obtained by the processing of Example 3;

FIG. 14 is the density curve for the blue density of a multicolor optical filter obtained by the processing of Example 3; and FIG. 15 is the color distribution of the film after the processing of Example 3.

DETAILED DESCRIPTION OF THE INVENTION

Compounds (1b) and (2b) forming dyes as used herein include usual colorless cyan, magenta, and yellow couplers, but exclude colored coupler. In addition, compounds forming azo-dyes through a diazo-coupling reaction can be used.

Dyes (1c) and (2c) as used herein include dyes for use in the silver dye bleach process. In addition, any dye which is decomposed by light according to the amount of exposure, losing the color thereof, can be used.

Examples of such magenta couplers include a 5-pyrazolone coupler, a pyrazolone benzimidazole coupler, a cyanoacetylcumarone coupler, and an open-chain acylacetonitrile coupler. Examples of yellow couplers include an acylacetamide coupler (e.g., benzoylacetanilides and pivaloylacetanilides). Examples of cyan couplers include a naphthol coupler and a phenol coupler. Preferred are non-diffusible couplers containing a hydrophobic group (ballast group) in the molecule. These couplers may be either 4-equivalent or 2-equivalent.

Representative examples of magenta color-forming couplers are described in U.S. Pat. Nos. 2,600,788, 2,983,608, 3,062,653, 3,127,269, 3,311,476, 3,419,391, 3,519,429, 3,558,319, 3,582,322, 3,615,506, 3,834,908, 3,891,445, West German Pat. No. 1,810,464, West German Patent Application (OLS) Nos. 2,408,665, 2,417,945, 2,424,467, Japanese Patent Publication No. 6031/65, Japanese Patent Application (OPI) Nos. 20826/76, 58922/77, 129538/74, 74027/74, 159336/75, 74028/74, 60233/75, 26541/76, 55122/78, etc.

Representative examples of yellow color-forming couplers are described in U.S. Pat. Nos. 2,875,057, 3,265,506, 3,408,194, 3,551,155, 3,582,322, 3,725,072, 3,891,445, West German Pat. No. 1,547,868, West German Patent Application (OLS) Nos. 2,219,917, 2,261,361, 2,414,006, British Pat. No. 1,425,020, Japanese Patent Publication No. 10783/76, Japanese Patent Application (OPI) Nos. 26133/72, 73147/73, 102636/76, 6341/75, 123342/75, 130442/75, 21827/76, 87650/75, 82424/77, 115219/77, etc.

Representative examples of cyan couplers are described in U.S. Pat. Nos. 2,369,929, 2,434,272, 2,474,293, 2,521,908, 2,895,826, 3,034,892, 3,311,476, 3,458,315, 3,476,563, 3,583,971, 3,591,383, 3,767,411, 4,004,929, West German Patent Application (OLS) Nos. 2,414,830, 2,454,329, Japanese Patent Application (OPI)

Nos. 59838/73, 26034/76, 5055/73, 146828/76, 69624/77, 90932/77, etc.

Examples of silver dye bleaching dyes which can be used in the invention are given below:

1. Non-diffusible trisazo dyes represented by the formula:

$R_1-N=N-R_2-N=N-R_3-N=N-R_4$ wherein $R_1$ and $R_4$ are each an aminonaphtholmonosulfonic acid or aminonaphtholdisulfonic acid nucleus, and $R_2$ and $R_3$ are each a benzene or naphthalene nucleus.

2. Compounds prepared by coupling the tetrazo compound of diaminotriphenylmethane with phenol, phenolsulfonic acid or naphtholsulfonic acid.

3. Azo dyes represented by the formula:

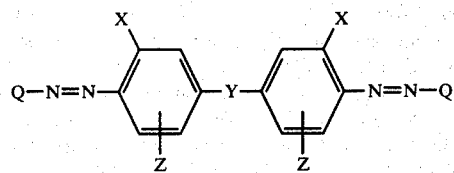

wherein X is a halogen or an alkyl group, Y is —NH—CO—NH—, —CH=CH—, or —(CH$_2$)$_n$— (wherein n is an integer of 1 to 8), Z is an alkyl group, a halogen, an alkoxy group, a sulfonic acid group, or a carboxylic acid group, and Q is

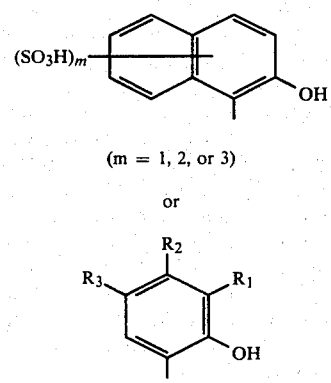

(m = 1, 2, or 3)

or wherein $R_1$, $R_2$ and $R_3$, which may be the same or different, each represents an alkyl group having 1 to 18 carbon atoms (preferably 1 to 5 carbon atoms), an alkoxy group having 1 to 18 carbon atoms (preferably 1 to 5 carbon atoms), a halogen, a sulfonic acid group or a carboxylic acid group.

4. Azo dyes represented by the formula:

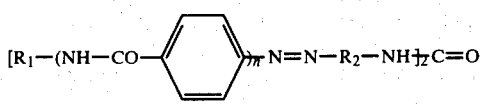

wherein $R_1$ is a benzene nucleus, a naphthalene nucleus, or a pyridine nucleus, $R_2$ is a benzene nucleus or a naphthalene nucleus, and n is 1, 2, or 3.

5. Bisazo dyes represented by the formula:

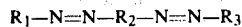

$R_1-N=N-R_2-N=N-R_3$ wherein $R_1$ is an amido group, a sulfonamido group, an acylamino group, an alkoxyl group, a cyano group, or an aminobenzene or aminonaphthalene nucleus having a dialkylamino group, $R_2$ is a 1-amino-2,5-dialkoxybenzene nucleus or a 1-amino-2-alkoxynaphthalene nucleus, and $R_3$ is an aminonaphtholsulfonic acid group.

6. Azo dyes represented by the formula:

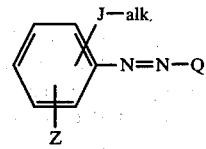

wherein J is an ether group, a carbonamido group, a carbamyl group, a sulfonamido group, or a sulfamyl group, alk is an aliphatic chain containing 8 or more carbon atoms, Z is hydrogen, an alkyl group, a halogen, a sulfonic acid group, or a carboxyl group, and Q is a suitable component for coupling.

7. Bisazo dyes represented by the formula:

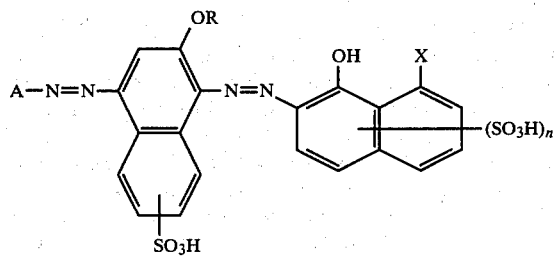

wherein A is an aminodiphenyl ether group, or the like, R is a methyl group or an ethyl group, X is a hydroxyl group or an amino group, and n is 1 or 2.

8. Azo dyes represented by the formula:

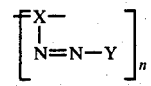

wherein X is an aromatic group, Y is a coupling component, and n is an integer of more than 1.

9. Azo dyes represented by the formula:

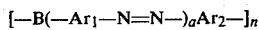

[—B(—Ar$_1$—N=N—)$_a$Ar$_2$—]$_n$ wherein Ar$_1$ and Ar$_2$ are each an aromatic, heterocyclic or aliphatic group having an azo group, B is a chemical bond interrupting a conjugated system, n is an integer of more than 1, and a is an integer from 1 to 4.

10. Azo dyes containing the block represented by the formula:

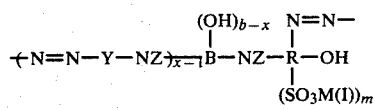

wherein B is an organic acid group, x is 2 or 3, b is 2 or 3, Z is hydrogen, an ethyl group, or a phenyl group, R is a naphthalene nucleus, m is 1 or 2, Y is a divalent aromatic group, and M(I) is a monovalent metal cation.

11. Azo dyes represented by the formula:

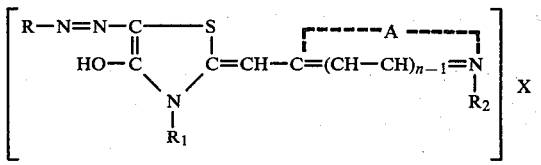

wherein A is a heterocyclic radical of a cyanine dye, R is an amine radical capable of being diazonated, $R_1$ and $R_2$ are each an alkyl group, an aralkyl group, or the like, X is an acid group, and n is 1 or 2.

Yellow dyes which are generally useful for use in this invention include azo dyes, such as Direct Fast Yellow GC (C.I. 29000), and Chrysophenine (C.I. 24895); benzoquinone-based dyes, such as Indigo Golden Yellow IGK (C.I. 59101), Indigosol Yellow 2GB (C.I. 61726), Algosol Yellow GCA-CF (C.I. 67301), Indanthrene Yellow GF (C.I. 68420), Mikethren Yellow GC (C.I. 67300), and Indanthrene Yellow 4GK (C.I. 68405); and anthraquinone-based, polynuclear soluble and like vat dyes.

Magenta dyes which are generally used include azo dyes, such as Sumilight Supra Rubinol B (C.I. 29225) and Benzobrilliant Geranine B (C.I. 15080); indigoid-based dyes, such as Indigosol Brilliant Pink IR (C.I. 73361), Indigosol Violet 15R (C.I. 59321), Indigosol Red Violet IRRL (C.I. 59316), Indanthrene Red Violet RRK (C.I. 67895), and Mikethren Brilliant Violet BBK (C.I. 6335); and soluble vat dyes composed of benzoquinone-based and anthraquinone-based heterocyclic compounds, and other vat dyes.

Cyan dyes include azo dyes, such as Direct Sky Blue 6B (C.I. 24410), Direct Brilliant Blue 2B (C.I. 22610), and Sumilight Supra Blue G (C.I. 34200); phthalocyanine dyes, such as Sumilight Supra Turquois Blue G (C.I. 74180) and Mikethren Brilliant Blue 4G (C.I. 74140); Indanthrene Turkys Blue 5G (C.I. 69845); Indanthrene Blue GCD (C.I. 73066); Indigosol 04G (C.I. 73046); and Anthrasol Green IB (C.I. 59826).

In the process of the invention, the silver dye bleach process can be used as a development processing, and hence the color stability of the dye of the filter have been greatly improved. The process of the invention, therefore, is particularly preferred when the development processing is performed by the silver dye bleach process.

Development processings which can be used in the process of the invention include a negative-positive process (as described, for example, in the *Journal of the Society of Motion Picture and Television Engineers*, Vol. 61, pp. 667-701 (1953)); a color reversal process in which development is performed with a developer containing therein a black-and-white developing agent to form a negative silver image, and the negative silver image so formed is subjected to at least one uniform light-exposure or another suitable fog treatment and subsequently to a color development to obtain a dye positive image; and a silver dye bleach process in which a photographic emulsion layer containing a dye is exposed to light and developed to form a silver image, and with the silver image so formed acting as a bleaching catalyst, the dye is bleached.

A color developer as used in the negative-positive process and color reversal process is generally composed of an alkaline aqueous solution containing therein a color developing agent.

Color developing agents which can be used include known primary aromatic amine developing agents, such as phenylenediamines, e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfonamidoethylaniline, and 4-amino-3-methyl-N-ethyl-N-β-methoxyethylaniline. In addition, color developing agents as described in L. F. A. Mason, *Photographic Processing Chemistry*, pp. 226-229, Focal Press (1966), U.S. Pat. Nos. 2,193,015 and 2,592,364, Japanese Patent Application (OPI) No. 64933/73, etc., can be used.

The color developer can further contain pH buffers, such as sulfites, carbonates, borates, and phosphates of alkali metals; development retarders, such as bromides, iodides, and organic antifoggants, and antifoggants. In addition, if desired, the color developer can contain water-softening agents; preservatives, such as hydroxylamine; organic solvents, such as benzyl alcohol and diethylene glycol; development accelerators, such as polyethylene glycol, quaternary amines, and amines; dye-forming couplers; competing couplers; fogging agents, such as sodium borohalide; auxiliary developing agents, such as 1-phenyl-3-pyrazolidone; tackifiers; polycarboxylic acid-based chelating agents as described in U.S. Pat. No. 4,083,723; and antioxidants as described in West German Patent Application (OLS) No. 2,622,950.

The photographic emulsions are bleached after the color development. The bleach treatment may be performed simultaneously with a fixing treatment or amy be performed separately.

Bleaching agents which can be used in the bleach treatment include compounds of multivalent metals such as iron (III), cobalt (IV), chromium (VI) and copper (II), peroxides, quinones, and nitroso compounds. For example, ferricyanides, dichromates, organic complex salt of iron (III) or cobalt (IV) [e.g., complex salts with aminopolycarboxylic acids (such as ethylenediaminetetraacetic acid, nitrilotriacetic acid, and 1,3-diamino-2-propanoltetraacetic acid) or organic acids (such as citric acid, tartaric acid, and malic acid)], persulfates, permanganates, and nitrosophenol. Of these compounds, potassium ferricyanide, ethylenediaminetetraacetic acid iron (III) sodium, and ethylenediaminetetraacetic acid iron (III) ammonium are particularly useful. Ethylenediaminetetraacetic acid iron (III) complex salts are useful in a mono-bath type blix (bleach-fix) solution as well as in a bleach solution.

The bleach solution or blix solution as used herein may further contain bleach accelerators as described in U.S. Pat. Nos. 3,042,520, 3,241,966, Japanese Patent Publication Nos. 8506/70, 8836/70, etc., the thiol compounds described in Japanese Patent Application (OPI) No. 65732/78, and other various additives.

The silver dye bleach process is performed as follows:

So-called black-and-white development is performed first, to form an imagewise reduced silver image. Depending on the purpose, superfluous silver halide may be removed by fixation. Subsequently, the gelatin-silver halide emulsion is processed with a dye bleach solution containing therein a compound capable of forming complex compounds with silver (such as potassium iodide, potassium thiocyanide, thiourea and thiourea derivatives (e.g., ethylthiourea and dimethylthiourea), semicarbazido, thiosemicarbazido, and other sulfur compounds) and acids such as sulfamic acid, hydrochloric acid, and sulfuric acid, or an alkaline dye bleach solution containing sodium sulfide, sodium hydrosulfite, stannous chloride, thiourea, or the like. This processing bleaches the dye contained in the gelatin-silver halide emulsion selectively in proportion to the amount of silver formed by the black-and-white development. Thereafter, desilvering (silver bleach and fixation) is performed to obtain a color image which is in the reverse position relative to the original silver image.

In the light-sensitive material for use in the process of the invention, a coupler capable of forming a dye through the coupling reaction with an oxidation product of an aromatic primary amine developing agent can be incorporated into one of the emulsion layers (L1) and (L2), and a dye capable of being imagewisely bleached by the so-called silver dye bleach process can be incorporated into the other emulsion layer. A development treatment which can be employed for such light-sensitive materials comprises the steps of:

(1) Black-and-white development
(2) Washing with water
(3) Dye bleaching
(4) Washing with water
(5) Fog color development
(6) Silver bleach
(7) Fixation
(8) Washing with water To accomplish light-exposure in accordance with the process of the invention, it is particularly preferred to use a light-transmitting filter in which there are: (a) areas not transmitting an amount of light sufficient to produce a color (image) in the emulsion layer (L2); (b) areas transmitting an amount of light sufficient to color the emulsion layer (L2) completely, but not sufficient to color the emulsion layer (L1); and (c) areas transmitting an amount of light sufficient to color the emulsion layer (L1) as well as the emulsion layer (L2) completely; and such areas are distributed corresponding to the colors pattern desired in the multicolor optical filter prepared by the process of the invention.

For light-exposure in the process of the invention, electromagnetic waves such as ultraviolet rays, infrared rays, X-rays, γ-rays and electron rays as well as visible rays (including white light, monochromatic light, a laser beam, etc.) can be used.

The invention is explained in further detail below with reference to the accompanying drawings.

A light-sensitive material for use in the process of the invention can have a structure as illustrated in FIG. 1 wherein an emulsion layer (L1) contains a cyan coupler forming a cyan dye on reacting with an oxidation product of an aromatic primary amine color-forming developing agent, and an emulsion layer (L2) contains a yellow coupler.

The sensitivities of the emulsion layers (L1) and (L2) are selected so as to have the relation that the light-sensitive material composed of the emulsion layers (L1) and (L2) provides a characteristic curve as illustrated in FIG. 2 when it is exposed to light through a continuous wedge and is then subjected to a black-and-white development processing. When the light-sensitive material having the foregoing characteristics is exposed to light through a transmitting filter (illustrated in FIG. 3) wherein areas providing the densities at A, B and C in the characteristic curve shown in FIG. 2 are arranged in a mosaic form, and it is then color-developed, the results shown in FIG. 4 are obtained. Thus, each area is colored as shown in FIG. 5.

When the light-sensitive material processed and colored as shown in FIG. 5 is irradiated with white light, the transmitted light is colored green by the superposition of a cyan color and a yellow color.

When the light-sensitive material as shown in FIG. 1 is exposed to white light through the filter shown in FIG. 3, the area A is not colored (i.e., is transparent), and the areas B and C are colored yellow and green, respectively, to thereby provide a multicolor optical filter having a pattern composed of colorless, yellow, and green areas as shown in FIG. 6.

As described above, the pattern formed in the multicolor optical filter is determined by the filter areas each of which transmits a different density of light.

Thus, a neutral filter having the appropriate pattern of areas, each having a different filter density corresponding to the desired multicolor optical filter, may be selected. For example, for producing a multicolor striped optical filter, a filter having a striped density distribution may be used, and for producing a multicolor mosaic optical filter, a filter having a mosaic density distribution may be used.

In the case of making a striped multicolor optical filter, the following process may be employed. That is, a three color striped optical filter can be produced by firstly exposing the photographic material using an optical wedge wherein areas (stripes) which are opaque to light and transparent areas twice as wide (line width) as the opaque areas are arranged alternately in stripe form, and then, after shifting the optical wedge in a direction perpendicular to the stripes with the same distance as the width (line width) of the opaque area, the photographic material is exposed again in an exposure amount, for example, of half of the first exposure above.

A light-exposure process as described in *Hyomen (Surface)*, Vol. 15, No. 2, pp. 91-95 (1977) can be used to make the filter used for subsequently exposing the light-sensitive material to produce the multicolor striped optical filter. For example, the filter (herein, the term "filter" refers to the device used in exposing the light-sensitive material) can be obtained by vapor-depositing chromium on a glass sheet, coating a resist polymer on the vapor-deposited chromium layer, and then etching the polymer layer by the process as described in *Hyomen*, ibid. The filter thus-obtained permits contact printing.

A filter can also be obtained by size-reducing printing a desired pattern on a photographic material prepared by coating a silver halide emulsion on a support such as a glass plate or a polyethylene terephthalate film through a lens.

The light-sensitive material for use in the process of the invention may be subjected to contact exposure through the filter thus-formed by controlling the exposure amount in conformity with the above-described exposure conditions. In this case, the light-sensitive material may be exposed to white light or blue light. Furthermore, when the silver halide emulsions used in the invention have been color sensitized, green light or red light may be used as the exposure light.

A filter having a relatively large pattern may be reduction-printed using a lens, and this method is simple and convenient for the production of the filter.

Alternatively, without the use of a filter, light-exposure can be performed in the desired pattern. That is, electron rays, laser, or the like can be scanned on a spot-by-spot basis on the light-sensitive material for use in the process of the invention while changing the output thereof depending on the pattern to be formed.

An object is color-separated by the use of the color filter thus-prepared which is composed of white light and two colors of cyan, magenta, and yellow colors arranged in a striped or mosaic pattern. The colors thus-separated are transmitted to a color image pick-up tube or color solid state image pick-up device to thereby form an image on the micro electrodes thereof arranged in a pattern corresponding to that of the filter. Thus, the outputs obtained depending on the intensity of light (referred to as $I_1$, $I_2$ and $I_3$, respectively) are sent to a calculation circuit where they are converted to obtain the output signals of the principal colors, red, green and blue (referred to as $I_r$, $I_g$ and $I_b$, respectively).

For example, in the case of a mosaic filter shown in FIG. 6:

The output of light passed through the transparent, cyan and green area of the filters refers to as $I_1$, $I_2$ and $I_3$, respectively;

the output of light passed through the transparent area can be expressed as $$I_1 = I_b + I_g + I_r;$$

the output of light passed through the cyan color area of the filter can be expressed as $$I_2 = I_b + I_g; \text{ and}$$

the output of light passed through the green area of the filter can be expressed as $$I_3 = I_g.$$

Thus, $$I_b = I_2 - I_3$$

$$I_g = I_3$$

$$I_r = I_1 - I_2$$

It is well known in the art that the video signals of blue, green and red are calculated by a calculation circuit.

The relation between the sensitivities of the emulsion layers (L1) and (L2) in the light-sensitive material used in the process of the invention preferably provides the characteristic curve shown in FIG. 2 when the light-sensitive material is subjected to black-and-white development. There is no limitation to the coating order of the emulsion layers (L1) and (L2) on a support. It is preferred, however, that the lower sensitivity layer is near the support. Each of the emulsion layers (L1) and (L2) may be composed of two or more layers. For example, in the photographic light-sensitive material for silver dye bleach process, each of the emulsion layers (L1) and (L2) may be composed of an emulsion layer and a dye layer.

In order to improve the granularity of the silver halide emulsions as well as the sharpness of the light-sensitive material, it is preferred to incorporate compounds that release development inhibitors during development into the emulsion layer or developer.

DIR couplers which can be used include couplers as described, for example, in U.S. Pat. Nos. 3,227,554, 3,617,291, 3,701,783, 3,790,384, 3,632,345, West German Patent Application (OLS) Nos. 2,414,006, 2,454,301, 2,454,329, British Patent No. 953,454, Japanese Patent Application (OPI) Nos. 69624/77, 122335/74, 69624/77, and Japanese Patent Publication No. 16141/76.

The light-sensitive material as used herein may contain compounds releasing development inhibitors during development instead of the DIR couplers as described above. Examples of such compounds which can be used include those as described in, for example, U.S. Pat. Nos. 3,297,445, 3,379,529, West German Patent Application (OLS) No. 2,417,914, and Japanese Patent Application (OPI) Nos. 15271/77 and 9116/78.

In the photographic light-sensitive material of the invention, a dispersion of a water-insoluble or water-sparingly soluble synthetic polymer can be incorporated into the photographic emulsion layers or other hydrophilic colloid layers, for example, for the purpose of improving the dimension stability.

Examples of such synthetic polymers include homo- or copolymers of alkyl acrylate or methacrylate, alkoxyalkyl acrylate or methacrylate, glycidyl acrylate or methacrylate, acrylamide or methacrylamide, vinyl esters (e.g., vinyl acetate), acrylonitrile, olefins, styrene, and the like, and copolymers of the foregoing monomers and acrylic acid, methacrylic acid, $\alpha,\beta$-unsaturated dicarboxylic acid, hydroxyalkyl acrylate or methacrylate, sulfoalkyl acrylate or methacrylate, styrenesulfonic acid and the like. For example, those synthetic polymers as described, for example, in U.S. Pat. Nos. 2,376,005, 2,739,137, 2,853,457, 3,062,674, 3,411,911, 3,488,708, 3,525,620, 3,607,290, 3,635,715, 3,645,740, British Pat. Nos. 1,186,699 and 1,307,373 can be used.

The photographic emulsion layers and other hydrophilic colloid layers of the light-sensitive material as used herein may contain various known surface active agents as coating aids, antistatic agents, agents for improving slipping properties, emulsion dispersibility, prevention of adhesion, and photographic properties (e.g., development acceleration, hardening, and sensitization).

The photographic emulsion layers and other hydrophilic colloid layers of the photographic light-sensitive material as used herein may contain inorganic or organic hardening agents.

Examples of such hardening agents include chromium salts (e.g., chromium alum and chromium acetate), aldehydes (e.g., formaldehyde, glyoxal, and glutaraldehyde), N-methylol compounds (e.g., dimethylol urea and methylol dimethylhydantoin), dioxane derivatives (e.g., 2,3-dihydroxydioxane), active vinyl compounds (e.g., 1,3,5-triacryloylhexahydro-s-triazine and bis(vinylsulfonyl)methyl ether), active halogen compounds (e.g., 2,4-dichloro-6-hydroxy-s-triazine), mucohalogenic acids (mucochloric acid and mucophenoxychloric acid), isooxazoles, dialdehyde starches, and 2-chloro-6-hydroxytriazinylated gelatin. These hardening agents can be used alone or in combination with each other.

The hydrophilic colloid layers of the light-sensitive material as used herein may further contain water-soluble dyes as filter dyes or for other various purposes such as prevention of irradiation. Examples of such dyes include oxonol dyes, hemioxonol dyes, styryl dyes, merocyanine dyes, cyanine dyes, and azo dyes.

In the practice of the process of the invention, conventional color-stabilizing agents can be used in combination. Color image stabilizers as used herein can be used alone or as a mixture comprising two or more thereof.

Examples of such conventional color-stabilizing agents include hydroquinone derivatives as described in U.S. Pat. Nos. 2,360,290, 2,418,613, 2,675,314, 2,701,197, 2,704,713, 2,728,659, 2,732,300, 2,735,765, 2,710,801, 2,816,028, British Pat. No. 1,363,921, etc., gallic acid derivatives as described in U.S. Pat. Nos. 3,457,079 and 3,069,262, etc., p-alkoxyphenols as described in U.S. Pat. Nos. 2,735,765, 3,698,909, and Japanese Patent Publication Nos. 20977/74 and 6623/77, p-oxyphenol derivatives as described in U.S. Pat. Nos. 3,432,300, 3,573,050, 3,574,627, 3,764,337, Japanese Patent Application (OPI) Nos. 35633/77, 147434/77 and 152225/77, and bisphenols as described in U.S. Pat. No. 3,700,455.

The light-sensitive material as used herein may contain hydroquinone derivatives, aminophenol derivatives, gallic acid derivatives, ascorbic acid derivatives, etc., as color antifoggants. Examples of such color antifoggants are described in U.S. Pat. Nos. 2,360,290, 2,336,327, 2,403,721, 2,418,613, 2,675,314, 2,701,197, 2,704,713, 2,728,659, 2,732,300, 2,735,765, Japanese Patent Application (OPI) Nos. 92988/75, 92989/75, 93928/75, 110337/75, 146235/77, Japanese Patent Publication No. 23813/75, etc.

The following examples are given to illustrate the invention in greater detail.

EXAMPLE 1

On a transparent polyethylene terephthalate film support which had been subjected to an undercoating treatment (gelatin-undercoating: 0.1 g/m$^2$), there were coated coating solutions for the layers shown below, to thereby prepare a light-sensitive material (designated Sample A).

First Layer: Low-Sensitivity Emulsion Layer

A solution of 42 g of Yellow Coupler (A) in a mixed solvent of 60 ml of tricresyl phosphate, 120 ml of ethyl acetate and 20 ml of dimethylformamide was emulsified and dispersed in 600 g of a 10% gelatin solution by the use of 3 g of sodium nonylbenzene sulfonate to prepare an emulsion (designated Emulsion I). Then, 350 g of Emulsion I was added to 700 g of a silver chlorobromide emulsion (silver: 0.42 mole; bromine content: 50 mole%) which had been prepared by a conventional controlled double-jet method, and furthermore, an aqueous solution containing 2 g of 2,4-dichloro-6-hydroxytriazine sodium was added thereto as a hardening agent to prepare the final emulsion for coating. The resulting emulsion was coated in a gelatin amount of 1.5 g/m$^2$.

Second Layer: Intermediate Layer

A solution of 50 g of 2,5-di-tert-octylhydroquinone in a mixed solvent of 100 ml of tricresyl phosphate and 100 ml of ethyl acetate was emulsified and dispersed in a 10% aqueous gelatin solution in the same manner as in the preparation of Emulsion I to prepare an emulsion (designated Emulsion II). Then, 250 g of Emulsion II and 2 g of 2,4-dichloro-6-hydroxytriazine sodium were dissolved in water, and the resulting aqueous solution was added to 1 kg of a 10% aqueous gelatin solution to obtain a coating solution. The resulting coating solution was coated in a gelatin amount of 1.5 g/m$^2$.

Third Layer: High-Sensitivity Emulsion Layer

A solution of 30 g of Cyan Coupler (B) in a mixed solvent of 30 ml of tricresyl phosphate and 60 ml of ethyl acetate was emulsified and dispersed in 300 g of a 10% aqueous solution of gelatin with 1.5 g of sodium nonylbenzene sulfonate to prepare an emulsion (designated Emulsion III). Then, 200 g of Emulsion III was mixed with 390 g of a silver chloroiodobromide emulsion (silver content: 0.24 mole; iodine content: 0.5 mole%; bromine content: 70 mole%) which had been prepared by a conventional controlled double-jet method, and furthermore, an aqueous solution containing 0.5 g of 2,4-dichloro-6-hydroxytriazine was added thereto as a hardening agent to thereby prepare a final emulsion for coating. The resulting emulsion was coated in a gelatin amount of 1.5 g/m$^2$.

Yellow Coupler (A)

α-Pivaloyl-α-(2,4-dioxo-5′,5′-dimethyloxazolidine-3-yl)-2-chloro-5-[α-(2,4-di-tert-pentylphenoxy)-butanamido]acetanilide

Cyan Coupler (B)

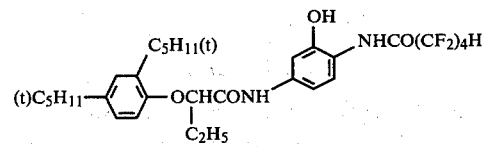

Fourth Layer: Protective Layer

To 1 kg of a 10% aqueous solution of gelatin was added an aqueous solution containing 1 g of sodium nonylbenzene sulfonate to prepare a coating solution for the protective layer. The resulting coating solution was coated in a gelatin amount of 1.5 g/m$^2$.

Thus, prepared Sample A was brought into close contact with a black striped filter (100μ line width) having densities of 0.05, 2.0, and more than 4.0, subjected to 1,000 CMS light-exposure by the use of a white light source (i.e., tungsten light) and processed according to the following steps:

|   |   | Temperature | Time |
|---|---|---|---|
| 1. | Color Development | 33° C. | 3 min 30 sec. |
| 2. | Bleach Fixation (blix) | 33° C. | 1 min 30 sec. |
| 3. | Water Washing | 33° C. | 3 min |

The composition of the processing solutions used in the foregoing steps were as follows:

| Developer | |
|---|---|
| Benzyl alcohol | 15 ml |
| Na$_2$SO$_3$ | 3 g |
| KBr | 0.4 g |
| Hydroxylamine sulfate | 2 g |
| 4-Amino-3-methyl-N—ethyl-N—β-(methanesulfonamido)ethylaniline | 5 g |
| Na$_2$CO$_3$ | 30 g |
| Diethylenetriaminepentaacetic acid | 5 g |

| Developer | |
|---|---|
| Water to make | 1,000 ml |
| | pH 10.1 |

| Blix Solution | |
|---|---|
| Ammonium thiosulfate (70% by weight) | 150 ml |
| Na$_2$SO$_3$ | 15 g |
| Na[Fe(EDTA*)] | 40 g |
| EDTA* | 4 g |
| Water to make | 1,000 ml |
| | pH 6.9 |

*EDTA: ethylenediaminetetraacetic acid

The thus-developed sample was measured with respect to red transmission density, green transmission density, and blue transmission density, by scanning with a Micro Photometer FMP Model S (produced by Fuji Photo Film Co., Ltd.). The results are shown in FIGS. 8, 9 and 10, respectively.

As is clear from the above results, a red, green, and blue stripe color line image could be prepared by the process of the invention.

EXAMPLE 2

Sample A prepared in Example 1 was exposed to soft X-rays (Cu, L$_\alpha$ line) for 3 seconds through a gold (Au) stripe mask which has been prepared by vapor-depositing gold on a silicon base plate at a line width of 20 μm with 10 μm intervals, and then after shifting the mask on the surface of the silver halide emulsion layer in a direction perpendicular to the stripe by 10 μm, the sample was exposed for 5 minutes. When the thus-processed sample was developed in the same manner as in Example 1, a colorless, green, and cyan stripe color line image was formed.

EXAMPLE 3

On a transparent polyethylene terephthalate film support which had been subjected to an undercoating treatment (gelatin-undercoating: 0.1 g/m$^2$) were provided the layers shown below in the sequence listed, to prepare a light-sensitive material.

First-Layer: Low-Sensitivity Silver Chlorobromide Emulsion Layer Containing Dye A (silver bromide 20 mole%)

Second Layer: Gelatin Intermediate Layer

Third Layer: High-Sensitivity Silver Chlorobromide Emulsion Layer Containing Dye B (silver bromide 50 mole%)

Fourth Layer: Gelatin Protective Layer

Dye A

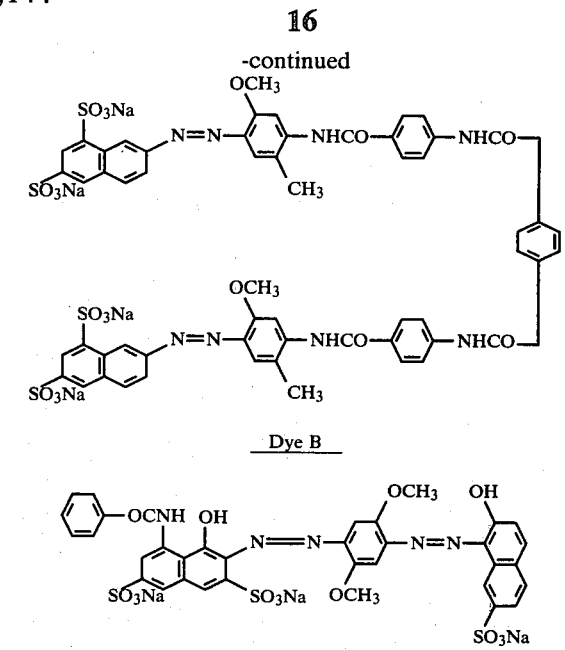

Dye B

The thus-prepared light-sensitive material was exposed to white light through a filter having the same pattern as for the filter shown in FIG. 3. Then, the material was subjected to such reduction-exposure so as to place the focus on the surface of the light-sensitive material with a lens (i.e., the lens is used to reduce the size of an image pattern), and was developed according to the following steps:

| | Temperature | Time |
|---|---|---|
| (1) Black-and-white development | 24° C. | 2 min |
| (2) Water washing | 24° C. | 5 min |
| (3) Dye bleaching | 24° C. | 4 min |
| (4) Silver blixing | 24° C. | 6 min |
| (5) Water washing | 24° C. | 3 min |

The formulations of the processing solutions used in the above processing steps are shown below:

| Black-And-White Developer | |
|---|---|
| EDTA-2Na | 1.0 g |
| Sodium sulfite | 60 g |
| Hydroquinone | 10 g |
| Sodium hydroxide | 5 g |
| Diethylene glycol | 20 ml |
| Phenidone | 0.4 g |
| Sodium carbonate | 20 g |
| Potassium bromide | 9 g |
| Benzotriazole | 0.1 g |
| Water to make | 1,000 ml |
| Dye Bleach Solution | |
| Water | 500 ml |
| Sulfamic acid | 135 g |
| Succinic acid | 20 g |
| Phenazine | 60 mg |
| Ethylene thiourea | 23 g |
| Thiourea | 5 g |
| Water to make | 1,000 ml |
| Silver Blix Solution | |
| EDTA-2Na | 2 g |
| Ethylenediaminetetraacetic acid di-iron salt | 40 g |
| Sodium sulfite | 5 g |
| Ammonium thiosulfate | 70 g |
| Water to make | 1,000 ml |

The thus-prepared film was measured in each color density by scanning with a micro photometer (measuring slit, 10 μm×10 mμ). The results are shown in FIGS. 12, 13 and 14.

These figures clearly indicate that the film has a color distribution as shown by the cross-sectional view of FIG. 15.

After the film was allowed to stand at 100° C. for 48 hours, the density thereof was measured with the micro photometer. This measurement showed that there was no change in the dye density.

While the invention has been described in detail and with reference to specific embodiments thereof, it will be apparent to one skilled in the art that various changes and modifications can be made therein without departing from the spirit and scope thereof.

What is claimed is:

1. A process for producing a multicolor optical filter, comprising the steps of:
(1) exposing a light-sensitive material including:
   (M-a) a silver halide emulsion layer (L1) containing:
      a compound (1b) capable of forming a dye having any one of the subtractive process three principal colors in proportion to the amount of exposure by development processing, or
      a dye (1c) having any one of the subtractive process three principal colors, and capable of losing the color in proportion to the amount of exposure by development processing; and
   (M-b) a silver halide emulsion layer (L2) containing:
      a silver halide emulsion (2a) having a sensitivity sufficient to reach a state at which further development does not proceed when it is exposed to an amount of exposure at which no imagewise development occurs in the emulsion layer (L1); and
      when compound (1b) is contained in layer (L1), a compound (2b) capable of forming a dye which has a color of the subtractive process three principal colors other than the color of the dye resulting from the compound (1b) contained in emulsion layer (L1) by development processing; or, when compound (1c) is contained in layer (L1), a dye (2c) having a color of the subtractive process three principal colors other than that of the dye (1c) contained in the emulsion layer (L1), and capable of losing the color in proportion to the amount of exposure by development processing;
wherein said light-sensitive material has a surface divided into a number of areas, and said exposure is performed such that
   (a) some of the areas are unexposed, or are exposed only to an extent that no imagewise development occurs in the emulsion layer (L2);
   (b) some of the areas are exposed to the extent that further development does not proceed in the emulsion layer (L2), but no imagewise development occurs in the emulsion layer (L1); and
   (c) the remaining areas are exposed to the extent that further development does not proceed in the emulsion layer (L1); and
(2) developing the exposed light-sensitive material.

2. A process as in claim 1, wherein silver halide emulsion layer (L1) contains a compound (1b), silver halide emulsion layer (L2) contains a compound (2b), and dyes are formed in said emulsion layers by development processing comprising a negative-positive process or a color reversal process.

3. A process as in claim 1, wherein silver halide emulsion layer (L1) contains a dye (1c), silver halide emulsion layer (L2) contains a dye (2c), and said development processing is carried out by a silver dye bleach process.

4. A process as in claim 1, 2, or 3, wherein the emulsion layer (L1) is coated directly on the support, and the emulsion layer (L2) is coated on emulsion layer (L1).

5. A multicolor optical filter made by a process comprising the steps of:
(1) exposing a light-sensitive material including:
   (M-a) a silver halide emulsion layer (L1) containing:
      a compound (1b) capable of forming a dye having any one of the subtractive process three principal colors in proportion to the amount of exposure by development processing, or
      a dye (1c) having any one of the subtractive process three principal colors, and capable of losing the color in proportion to the amount of exposure by development processing; and
   (M-b) a silver halide emulsion layer (L2) containing:
      a silver halide emulsion (2a) having a sensitivity sufficient to reach a state at which further development does not proceed when it is exposed to an amount of exposure at which no imagewise development occurs in the emulsion layer (L1); and
      when compound (1b) is contained in layer (L1), a compound (2b) capable of forming a dye which has a color of the subtractive process three principal colors other than the color of the dye resulting from the compound (1b) contained in emulsion layer (L1) by development processing; or, when compound (1c) is contained in layer (L1), a dye (2c) having a color of the subtractive process three principal colors other than that of the dye (1c) contained in the emulsion layer (L1), and capable of losing the color in proportion to the amount of exposure by development processing;
wherein said light-sensitive material has a surface divided into a number of areas and said exposure is performed such that
   (a) some of the areas are unexposed, or are exposed only to an extent that no imagewise development occurs in the emulsion layer (L2);
   (b) some of the areas are exposed to the extent that further development does not proceed in the emulsion layer (L2), but no imagewise development occurs in the emulsion layer (L1); and
   (c) the remaining areas are exposed to the extent that further development does not proceed in the emulsion layer (L1); and
(2) developing the exposed light-sensitive material.

6. A multicolor optical filter as in claim 5, wherein silver halide emulsion layer (L1) contains a compound (1b), silver halide emulsion layer (L2) contains a compound (2b), and dyes are formed in said emulsion layers by development processing comprising a negative-positive process or a color reversal process.

7. A multicolor optical filter as in claim 5, wherein silver halide emulsion layer (L1) contains a dye (1c), silver halide emulsion layer (L2) contains a dye (2c), and said development processing is carried out by a silver dye bleach process.

8. A multicolor optical filter as in claim 5, 6, or 7, wherein the emulsion layer (L1) is coated directly on the support, and the emulsion layer (L2) is coated on emulsion layer (L1).

* * * * *